United States Patent [19]
Johnston

[11] Patent Number: 5,653,257
[45] Date of Patent: Aug. 5, 1997

[54] FLOW CONTROL LIMITER

[75] Inventor: Mervyn Johnston, Salisbury, Md.

[73] Assignee: Dresser Industries, Dallas, Tex.

[21] Appl. No.: 613,355

[22] Filed: Mar. 11, 1996

[51] Int. Cl.⁶ .................................................. F16K 15/00
[52] U.S. Cl. .................................... 137/517; 138/46
[58] Field of Search ............................ 137/515.7, 517, 137/504; 138/46; 251/337

[56] References Cited

U.S. PATENT DOCUMENTS

| | | |
|---|---|---|
| 934,546 | 9/1909 | Kriebel .................... 137/515.7 |
| 2,655,934 | 10/1953 | Clair . |
| 2,674,261 | 4/1954 | Wilson . |
| 2,729,234 | 1/1956 | Stevenson . |
| 2,729,235 | 1/1956 | Stevenson . |
| 2,781,775 | 2/1957 | Merrill . |
| 3,254,667 | 6/1966 | McGuire et al. . |
| 3,469,605 | 9/1969 | Courtot et al. . |
| 3,612,214 | 10/1971 | Blatt . |
| 3,633,612 | 1/1972 | Gross . |
| 3,659,573 | 5/1972 | Bennett .................... 137/515.7 |
| 3,675,733 | 7/1972 | Blatt . |
| 3,749,122 | 7/1973 | Gold ........................ 137/517 |
| 3,750,700 | 8/1973 | Ecuer . |
| 3,854,497 | 12/1974 | Rosenberg . |
| 3,890,999 | 6/1975 | Moskow . |
| 3,902,523 | 9/1975 | Gaut . |
| 4,244,526 | 1/1981 | Arth ........................ 137/517 |
| 4,319,604 | 3/1982 | Bird . |
| 4,436,111 | 3/1984 | Gold et al. . |
| 4,570,857 | 2/1986 | Rosenberg . |
| 4,593,715 | 6/1986 | Stich et al. . |
| 4,655,248 | 4/1987 | Chalaire .................... 137/515.7 |
| 4,700,733 | 10/1987 | Uchino et al. . |
| 4,753,264 | 6/1988 | Uchino et al. . |
| 4,811,756 | 3/1989 | Hall . |
| 4,819,688 | 4/1989 | Field . |
| 4,842,198 | 6/1989 | Chang . |
| 4,919,305 | 4/1990 | Podgers . |
| 5,417,259 | 5/1995 | Schneider . |

OTHER PUBLICATIONS

"Nozzle Accessories," *Vapor Recovery Nozzles and Accessories*, EMCO Wheaton Catalog VR Oct. 1985, p. 6.

Primary Examiner—Denise L. Ferensic
Assistant Examiner—Ramyar M. Farid
Attorney, Agent, or Firm—Haynes and Boone, L.L.P.

[57] ABSTRACT

A flow control limiter for limiting the volumetric flow rate of a fluid flowing through a line. A stator is matingly seated in the line, and includes a sleeve portion and a curved portion extending outwardly and upstream from the sleeve portion. The stator further includes a centrally disposed neck portion connected to the sleeve portion. A shuttle is slidably fitted onto the neck portion such that an annular space is formed between the shuttle and the curved portion of the stator for the flow of fluid therethrough, the shuttle being slidable between an upstream position and a downstream position. A spring is disposed between the stator and the shuttle to bias the shuttle toward the upstream position. The surface of the curved portion of the stator is configured so that when fluid flow causes the shuttle to move downstream at a constant rate against the bias of the spring, the size of the annular space decreases at a decreasing rate to maintain a substantially constant maximum volumetric flow rate of fluid through the line.

9 Claims, 2 Drawing Sheets

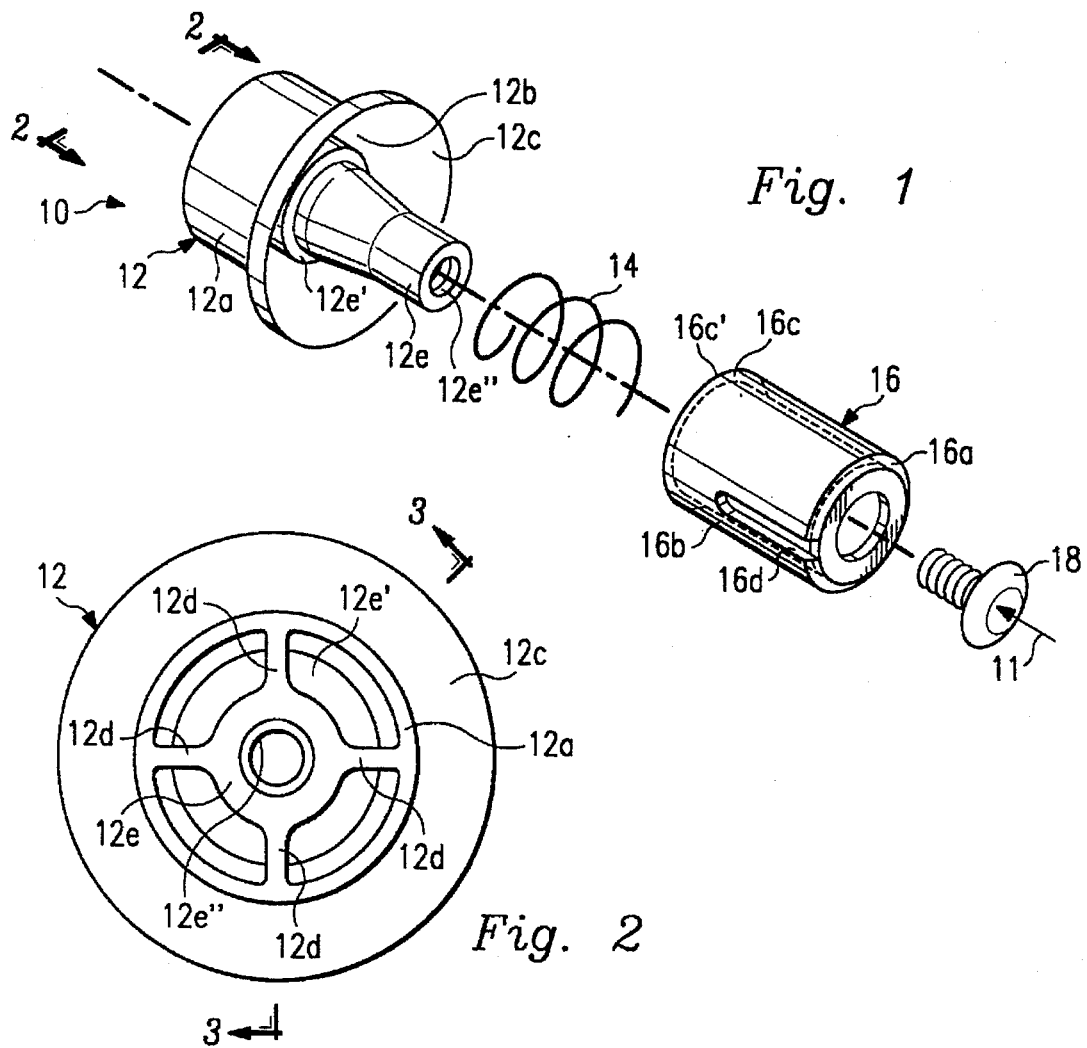
Fig. 1
Fig. 2
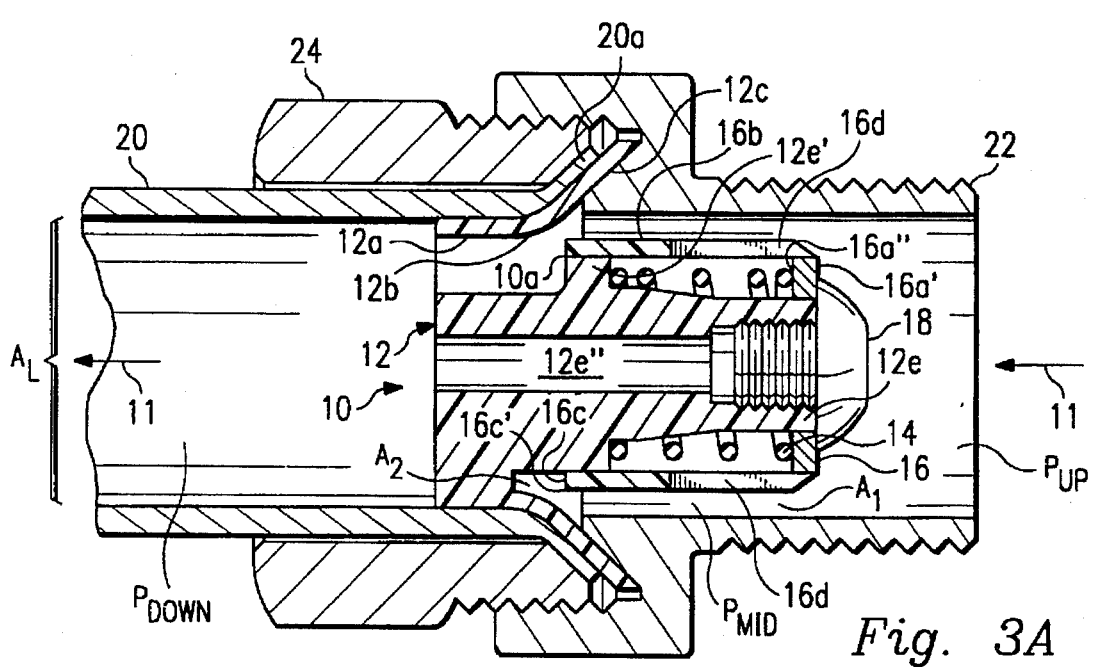
Fig. 3A

FLOW CONTROL LIMITER

BACKGROUND OF THE INVENTION

The present invention relates to an apparatus for controlling the flow rate of a fluid through a line and, more particularly, for limiting the maximum volumetric flow rate of a fluid through a line.

There are many flow control valves which limit the volumetric flow rate of a fluid through a line. Such valves are commonly provided with a moveable control element which is urged in one direction by the fluid pressure drop across the element, and in the opposite direction by a pre-compressed (i.e., preloaded) spring. The position of the control element effects the size of a control area through which the fluid flows and, hence, effects the pressure drop across the area and the fluid flow rate. As the pressure drop acting on the control element increases beyond a threshold pressure drop necessary to overcome the preload force of the spring, the spring deflects and the control element is accordingly displaced. As the control element is displaced, the control area decreases and the fluid pressure drop increases until the force on the element created by the pressure drop is equivalent to that of the spring force.

A drawback to the foregoing configuration is that the size of the control area is directly proportional to the displacement of the control element from an initial upstream position. The fluid passing through this control area, however, experiences a pressure drop inversely proportional to the square of the size of the control area. Consequently, the relationship between the pressure drop force and the displacement of the element is quadratic. In contrast, the relationship between the spring force and the displacement of the element is linear, rather than quadratic. As a result, the pressure drop force and the spring force are balanced at only one position of the element; at all other positions of the element there will be an imbalance. Hence, the control element will operate in only two positions, i.e., in a fully upstream, or open, position, and in a fully downstream, or closed, position.

Therefore, what is needed is a flow control limiter in which a maximum volumetric fluid flow rate is maintained when the fluid pressure drop exceeds the threshold pressure drop.

SUMMARY OF THE INVENTION

The present invention, accordingly, provides a flow control limiter in which a maximum volumetric fluid flow rate is maintained when the fluid pressure drop exceeds a threshold pressure drop. To this end, the flow control limiter of the present invention comprises a stator matingly seated in the line, which stator includes a sleeve portion and a curved portion extending outwardly and upstream from the sleeve portion. The stator further includes a centrally disposed neck portion connected to the sleeve portion. A shuttle is slidingly fitted onto the neck portion such that an annular space is formed between the shuttle and the curved portion of the stator for the flow of fluid therethrough, the shuttle being slidable between an upstream position and a downstream position. A spring is disposed between the stator and the shuttle to bias the shuttle toward the upstream position. The surface of the curved portion of the stator is configured so that when the fluid pressure drop displaces the shuttle downstream against the bias of the spring, the size of the annular space decreases to maintain a substantially constant maximum volumetric flow rate of fluid through the line.

An advantage achieved with the present invention is that the desired maximum volumetric fluid flow rate is maintained when the fluid pressure drop exceeds the threshold pressure drop.

Another advantage achieved with the present invention is that the configuration of the limiter permits it to be readily retro-fitted into existing lines such as those used in gasoline dispensers.

BRIEF DESCRIPTION OF THE DRAWINGS

FIG. 1 is an exploded perspective view of the apparatus of the present invention.

FIG. 2 is an end view of the apparatus of FIG. 1 as viewed according to the line 2—2 of FIG. 1.

FIG. 3A is a cross-sectional elevational view of the apparatus of FIG. 1 installed in a fluid flow line, taken along the line 3—3 of FIG. 2, with the shuttle disposed in a fully upstream position.

DESCRIPTION OF THE PREFERRED EMBODIMENTS

Figure 3B:
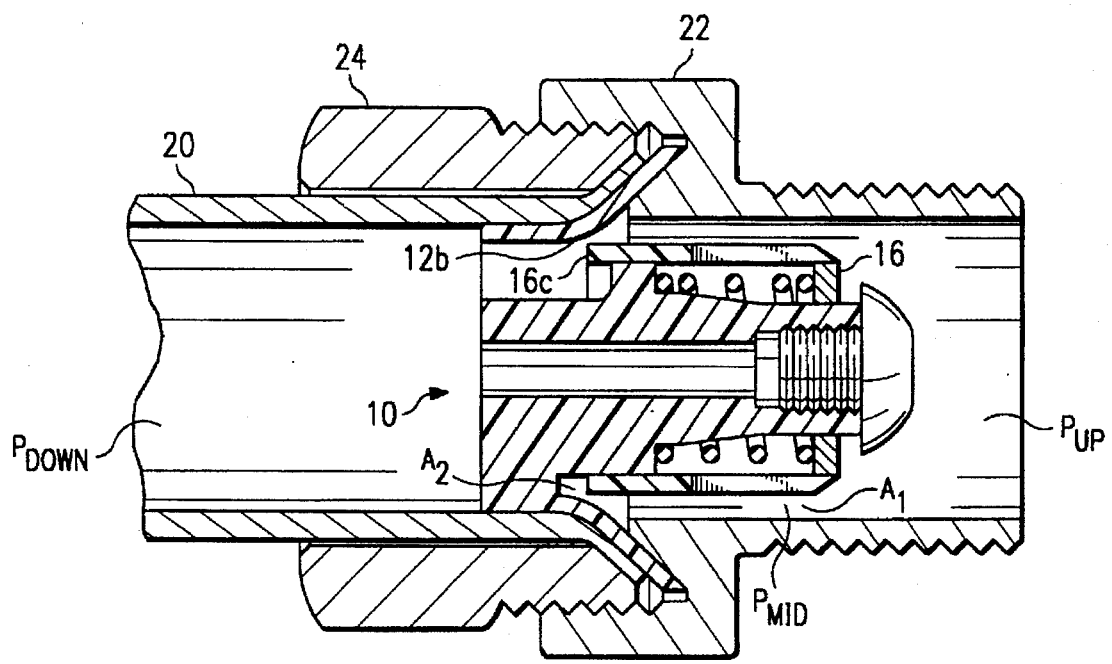
FIG. 3B is a cross-sectional elevational view of the apparatus of FIG. 1 installed in a fluid flow line, taken along the line 3—3 of FIG. 2, with the shuttle disposed in an intermediate position between the upstream position and a downstream position.

Referring to FIG. 1 of the drawing, the reference numeral 10 refers, in general to the flow control limiter of the present invention, the limiter being configured for fluid flowing in the direction of an arrow 11 from an upstream end of the limiter to a downstream end. The limiter 10 includes a stator 12 comprising a cylindrical sleeve portion 12a, a curved portion 12b extending from the upstream end of the sleeve portion, and a frusto-conical flared portion 12c extending outwardly from the curved portion. The shape of the surface of the curved portion 12b is discussed in greater detail below.

Referring to both FIGS. 1 and 2, four fingers 12d (FIG. 2) extend radially inwardly from the sleeve portion 12a to a longitudinally extending neck portion 12e which is centrally disposed in the sleeve portion. The neck portion 12e includes, for reasons described below, a shoulder portion 12e' and a hole 12e'' formed therein.

Referring to FIGS. 1 and 3A, a spring 14 and a hollow, cylindrically-shaped, open-ended shuttle 16 are slidably mounted onto the stator neck portion 12e. The spring 14 is defined by a spring rate, discussed below, and is pre-compressed, i.e., preloaded, to exert a preload force $F_{PRELOAD}$, also discussed below, between the shoulder portion 12e' and the shuttle upstream end 16a.

As more clearly shown in FIG. 3A, the shuttle 16 includes a beveled upstream end 16a having an upstream face 16a' and a downstream face 16a'', an outer surface 16b, and a downstream end 16c having an outer edge 16c'. Two slots 16d (only one of which is shown in FIG. 1) extend from the exterior of the shuttle 16 through the surface 16b to the interior of the shuttle to provide fluid communication therethrough. It is understood that the number, size, and shape of the slots 16d may vary provided fluid communication is maintained between the interior and the exterior of the shuttle 16. A fastener 18, such as a screw, bolt, or rivet, extends through the upstream end 16a of the shuttle 16 and is secured within the hole 12e" to thereby secure to the stator 12, and limit the upstream movement of, the shuttle 16 and, further, to secure the spring 14 on the neck portion 12e between the shoulder portion 12e' of the neck and the upstream end 16a of the shuttle. It can be appreciated that, due to normal manufacturing tolerances, a small annular space 10a (FIG. 3A) through which fluid may flow will be formed between the shuttle 16 and the shoulder portion 12e' on which the shuttle is slidably mounted.

Figure 3C:
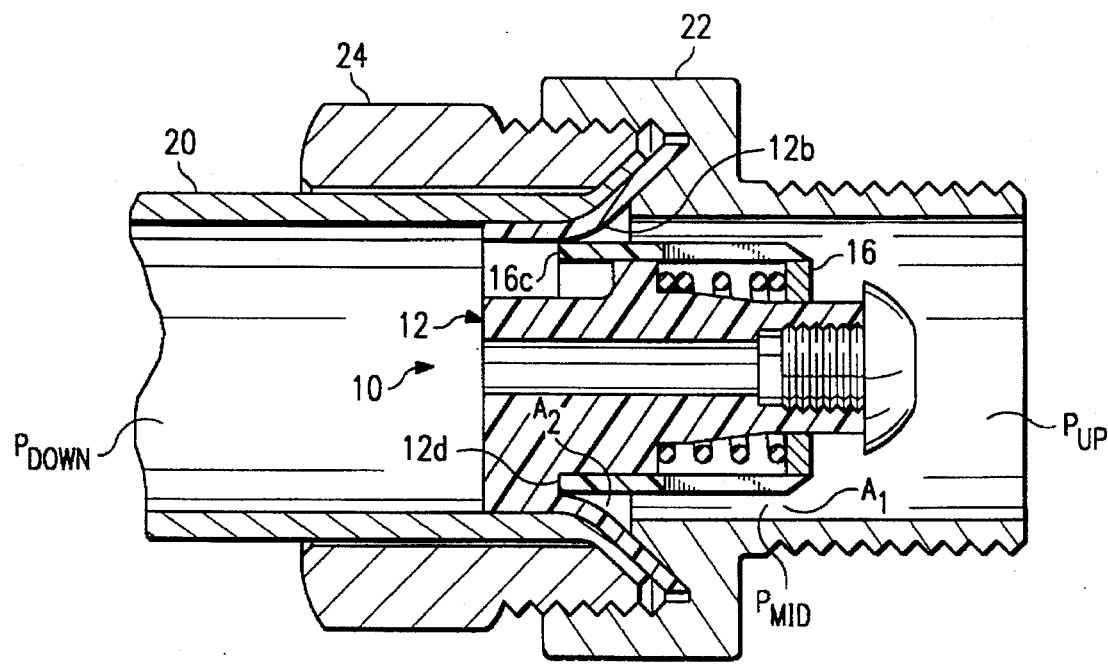
FIG. 3C is a cross-sectional elevational view of the apparatus of FIG. 1 installed in a fluid flow line, taken along the line 3—3 of FIG. 2, with the shuttle disposed in a fully downstream position.

In FIGS. 3A, 3B, and 3C, the flow control limiter 10 is shown mounted in a fluid line 20. As shown in FIG. 3A, the sleeve portion 12a, the curved portion 12b, and the flared portion 12c of the stator 12 matingly seat within a flared end 20a of the line 20 and are secured thereto by conventional fittings 22 and 24. The shuttle 16, slidably secured to the neck portion 12e of the stator 12, is depicted in an upstream ("fully open") position in FIG. 3A, in a downstream ("fully closed") position in FIG. 3C, and in an intermediate position in FIG. 3B between the upstream and downstream positions. It can be appreciated that the upstream movement of the shuttle 16 is constrained by the fastener 18 as shown in FIG. 3A, and that the downstream movement of the shuttle is constrained by the fingers 12d as shown in FIG. 3C. While not shown, it is understood that an upstream portion of the line 20 would typically be coupled to the fitting 22.

It can be appreciated that the line 20, the flow control limiter 10, and the fitting 22 define at least three different cross-sectional areas through which fluid may flow. First, a cross-sectional area $A_L$ is defined in the line 20 as well as in the fitting 22. Between the fitting 22 and the shuttle outer surface 16b of the flow control limiter 10, an annular cross-sectional area $A_1$ is defined through which fluid flows as it enters the limiter. Downstream of the area $A_1$, an annular generally frusto-conical cross-sectional flow control area $A_2$ extends generally perpendicularly from the curved portion 12b of the stator 12 to the outer edge 16c' of the shuttle 16. It will be appreciated that the area $A_2$ varies from a maximum area to a minimum area as the shuttle 16 moves from a fully upstream position as shown in FIG. 3A to a fully downstream position as shown in FIG. 3C, respectively. The area $A_2$ is a maximum portion 12b of the stator 12. The areas $A_1$ and $A_2$ are configured to be as large as possible when the shuttle 16 is disposed in the upstream position shown in FIG. 3A so that the restriction on the flow of fluid therethrough is minimized when the volumetric flow rate is less than a desired maximum volumetric flow rate ($V_{MAX}$).

It can be further appreciated that as fluid flows through the limiter 10, at least three pressure regions are formed. A first pressure region having a pressure $P_{UP}$ is formed upstream of the limiter 10. As the fluid flows through the area $A_1$, the fluid will experience a first pressure drop of $P_1$ and a mid-stream pressure region having a pressure $P_{MID}$ will be formed between the upstream end 16a and the downstream end 16c of the shuttle 16. It should be noted that $P_{MID}$ is communicated through the slots 16d to the interior of the shuttle 16, including the downstream face 16a" of the shuttle upstream end 16a. As the fluid flows through the area $A_2$, the fluid will experience a second pressure drop of $P_2$ and a downstream pressure region having a pressure $P_{DOWN}$ will be formed downstream of the limiter 10. The first pressure drop, $P_1$, is thus equal to $P_{UP}$ less $P_{MID}$, and the second pressure drop, $P_2$, is equal to $P_{MID}$ less $P_{DOWN}$.

As a result of the first pressure drop $P_1$, a first pressure drop force $F_1$ acts on the shuttle 16 and is equal to the product of $P_1$ and the surface area of the shuttle downstream face 16a" exposed to $P_{MID}$. A second pressure drop force $F_2$ acts on the shuttle 16 and is equal to the product of the surface area of the shuttle downstream end 16c exposed to $P_{DOWN}$, and the sum of $P_1$ and $P_2$.

As a result of the foregoing, it can be appreciated that a net fluid force, $F_{NET}$, defined as the sum of $F_1$ and $F_2$, will urge the shuttle 16 downstream. The spring preload force $F_{PRELOAD}$ constrains the shuttle 16 in the upstream position shown in FIG. 3A against the urging of $F_{NET}$ until the fluid flow rate is equal to $V_{MAX}$. Accordingly, the spring 14 is sized such that, when secured between the stator shoulder portion 12e' and the shuttle upstream end 16a, the magnitude of the aforementioned $F_{PRELOAD}$ is substantially equal to the value of $F_{NET}$ when the shuttle 16 is in the fully open position and fluid is flowing across it at a rate of $V_{MAX}$, under which conditions $F_2$ is negligible and $F_{NET}$ is therefore substantially equal to $F_1$. The spring rate of the spring 14 is equal to the value of $F_{NET}$ required to fully close the shuttle 16 less $F_{PRELOAD}$, divided by the travel of the shuttle 16 as it is displaced from the fully open position shown in FIG. 3A to the fully closed position shown in FIG. 3C.

With reference to the control area $A_2$, it can be appreciated that the size thereof will vary with the shape of the curved portion 12b and the position of the shuttle 16 along the neck portion 12e of the stator 12. It can be further appreciated that $P_2$ and, therefore, $F_2$ will vary with the size of the control area $A_2$. Conversely, it can be appreciated that given a desired size for the area $A_2$ for various positions of the shuttle 16, the shape of the curved portion 12b may be derived. Accordingly, for each of a number of displacements of the shuttle 16 from the upstream position shown in FIG. 3A, the control area $A_2$ required to produce a pressure drop $P_2$ directly proportional to that shuttle displacement may be calculated and the shape of the curved portion 12b derived therefrom.

To thus derive the shape of the curved portion 12b, tests are performed on fluid flowing through a line, wherein the fluid and line size are comparable to those for which the limiter 10 is intended to operate. Fixed area annular rings, configured to simulate $A_1$ and $A_2$ in the limiter 10, are then placed in the line and, with the fluid flowing through the line at a volumetric flow rate of $V_{MAX}$, the pressure drops across the rings are obtained and the coefficients of discharge ($C_d$) are determined in a conventional manner.

Having performed the foregoing tests, the displacement of the shuttle 16 between the fully open and the fully closed positions (i.e., the maximum displacement) is then correlated with the maximum pressure drop measured for $V_{MAX}$. A number of shuttle displacements ranging from zero to the maximum displacement are then tabulated and correlated with an equal number of pressure drops determined such that the ratio of each pressure drop to the maximum pressure drop is equal to the ratio of the corresponding displacement to the maximum displacement. A coefficient of discharge, $C_d$, derived or interpolated from the determined test values, is then correlated with each of the tabulated pressure drops. As an example, if, in a line having an inside diameter of 0.75 inches, the maximum shuttle displacement is 0.120 inches, and the maximum pressure drop is 15 psi, then a tabulation of values determined according to the foregoing discussion may appear as follows:

| Displacement (in.) | $P_2$ (psi) | $C_d$ |
| --- | --- | --- |
| 0.000 (FIG. 3A) | -negligible- | — |
| 0.020 | 2.5 | 0.65 |

-continued

| Displacement (in.) | $P_2$ (psi) | $C_d$ |
|---|---|---|
| 0.040 | 5.0 | 0.70 |
| 0.060 (FIG. 3B) | 7.5 | 0.72 |
| 0.080 | 10.0 | 0.75 |
| 0.100 | 12.5 | 0.84 |
| 0.120 (FIG. 3C) | 15.0 | 0.95 |

Having established the foregoing tabulated data, the size of the annular control area $A_2$ required to generate the tabulated pressure drops may be calculated for each tabulated shuttle displacement using the following equation:

$$A_2 = \left[ 2\frac{P_2}{\rho} \left( \frac{C_d}{V_{MAX}} \right)^2 + \frac{C_d}{A_L^2} \right]^{-0.5}$$

where:

$A_2$ is the size of the annular control area (FIGS. 3A–3B);

$P_2$ is the tabulated pressure drop through the control area $A_2$;

$\rho$ is the density of the fluid;

$V_{MAX}$ is the desired maximum volumetric flow rate;

$C_d$ is the tabulated coefficient of discharge; and $A_L$ is the size of the cross-sectional area of the line (FIG. 3A).

Having calculated the required control area $A_2$ required at each tabulated displacement of the shuttle 16, the shape of the surface of the curved portion 12b may be developed using conventional design techniques, it being understood that the surface thereof should be blended smooth between the tabulated displacement points.

In operation, the limiter 10 is installed in the fluid line 20 as shown in FIG. 3A and secured thereto with the connectors 22 and 24. It can be appreciated that the flared portion 12c of the stator 12 acts as a seal, thereby obviating the need for a separate seal in the connection.

As pressurized fluid flows through the limiter 10 in the direction of the arrow 11, the fluid flows over the upstream end 16a of the shuttle 16, across the shuttle outer surface 16b, through the control area $A_2$, and through the sleeve portion 12a of the stator 12. A small portion of the fluid also flows through the slots 16d into the interior of the shuttle 16 and out through the annular space 10a formed between the shoulder 12e' and the shuttle 16.

It can be appreciated that as fluid flows through the limiter 10, the net fluid force $F_{NET}$ urges the shuttle 16 downstream, in the direction of the arrow 11. The spring 14, however, constrains the shuttle 16 in the upstream position (FIG. 3A) until the fluid flow rate begins to exceed $V_{MAX}$. As the fluid flow rate exceeds $V_{MAX}$, the net fluid force $F_{NET}$ acting on the shuttle 16 exceeds the spring preload force $F_{PRELOAD}$, thereby causing the shuttle 16 to be displaced downstream from the fully open position shown in FIG. 3A toward the intermediate and the fully closed positions shown in FIGS. 3B and 3C, respectively. As the shuttle 16 moves downstream, the size of the control area $A_2$ decreases non-linearly in such a manner that the pressure drop $P_2$ across the control area $A_2$ increases linearly. Equivalently, if the shuttle 16 moves downstream at, for example, a constant rate, the control area $A_2$ will decrease at a decreasing rate and the pressure drop $P_2$ will increase at a substantially constant rate. The pressure drop $P_2$ thus increases substantially linearly in direct proportion to the displacement of the shuttle 16 from the upstream position. Hence, the volumetric flow rate of fluid through the limiter 10 is maintained at a substantially constant flow rate of $V_{MAX}$ when a threshold pressure drop is exceeded, the threshold pressure drop being substantially the value of $P_2$ when the fluid flow rate approaches $V_{MAX}$.

The present invention has several advantages. For example, the volumetric fluid flow rate $V_{MAX}$ is maintained independent of either the upstream or the downstream absolute pressures. A further advantage is that the configuration of the limiter 10 permits it to be readily retro-fitted into existing lines such as those used in gasoline dispensers.

It is understood that several variations may be made in the foregoing without departing from the scope of the invention. For example, the control area $A_2$ may be derived using alternate techniques such as the finite element method. Alternatively, the control area $A_2$ may be approximated fairly well as having a generally flat shape rather than a frusto-conical shape, thereby significantly simplifying calculations. The control area $A_2$ may be developed to accommodate a number of other considerations not mentioned above which could impact the flow rate such as, for example, fluid turbulence within the limiter 10, or a spring or a plurality of springs configured to provide a nonlinear spring rate. The shuttle 16 may also be configured to more greatly facilitate the flow of fluid. For example, the surface 16b of the shuttle 16 may be tapered radially inwardly from the upstream end 16a to the edge 16c' of the shuttle downstream end 16c. As a consequence of such taper, the wall thickness of the shuttle 16 may also be minimized at the downstream end 16c of the shuttle 16 so that the force acting on the shuttle may be more readily managed. The upstream end 16a may be provided with lands which permit fluid pressure to act on a greater portion of the upstream end 16a when $F_{NET}$ is insufficient to overcome $F_{PRELOAD}$, thereby preventing the surface area of the upstream end 16a exposed to fluid from increasing abruptly (i.e., non-linearly) when the shuttle 16 begins to move from the upstream position. The limiter 10 may be configured so that the curved surface is formed proximal to the upstream end of the shuttle 16 or as a part of the upstream or downstream end of the shuttle. It is understood, too, that the fluid flowing through the limiter 10 may be compressible or non-compressible.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A flow control limiter for limiting the volumetric flow rate of a fluid flowing through a flow line, the flow line defining an upstream end and a downstream end, the limiter comprising:

two mating fittings defining the flow line a fixed member disposed in the flow line, the fixed member having an annular curved portion which extends curvilinearly from a longitudinally oriented subportion toward a radially oriented subportion upstream of the longitudinally oriented subportion, the radially oriented subportion being sandwiched between the two mating fittings;

a movable member disposed in the flow line in the path of the fluid and defining with the annular curved portion of the fixed member, a flow passage therebetween;

means threadingly engaged with the fixed member and in contact with the movable member in the upstream position for constraining upstream movement of the movable member beyond the upstream position;

a biasing member acting on the movable member to bias the movable member towards the upstream position;

wherein the pressure of the fluid causes movement of the movable member relative to the fixed member towards a downstream position;

the members being configured so that the pressure drop of the fluid flowing through the passage limits the volumetric flow rate of the fluid to a predetermined maximum volumetric flow rate independent of the pressure of the fluid upstream of the limiter wherein;

a control area is defined in the flow passage and extends from the downstream end of the movable member to the annular curved portion of the fixed member, the control area being substantially perpendicular to the surface of the annular curved portion, wherein the size of the control area decreases at a decreasing rate in response to movement of the movable member toward the downstream end at a constant rate so that the pressure drop of fluid flowing through the passage increases substantially linearly in direct proportion to the displacement of the movable member from the upstream position.

2. The limiter of claim 1 wherein the biasing member is preloaded with a preload force sufficient to constrain the movable member in the upstream position until the fluid flow rate exceeds the predetermined maximum volumetric flow rate.

3. The limiter of claim 2 wherein the flow of fluid generates a force which acts against the bias of the biasing member and wherein the biasing member is a spring which compresses when a force generated by the fluid flow exceeds the preload force.

4. A flow control limiter for limiting the volumetric flow rate of a fluid flowing through a flow line, the flow line defining an upstream end and a downstream end, the limiter comprising:

two mating fittings defining the flow line a fixed member disposed in the flow line, the fixed member having an annular curved portion which extends curvilinearly from a longitudinally oriented subportion toward a radially oriented subportion upstream of the longitudinally oriented subportion, the radially oriented subportion being sandwiched between the two mating fittings;

a movable member disposed in the flow line in the path of the fluid and defining with the annular curved portion of the fixed member, a flow passage therebetween;

means threadingly engaged with the fixed member and in contact with the movable member in the upstream position for constraining upstream movement of the movable member beyond the upstream position;

a biasing member acting on the movable member to bias the movable member towards the upstream position;

wherein the pressure of the fluid causes movement of the movable member relative to the fixed member towards a downstream position;

the members being configured so that as the pressure drop of the fluid flowing through the flow passage exceeds a threshold pressure drop, a substantially constant predetermined volumetric fluid flow rate is maintained wherein;

a control area is defined in the flow passage and extends from the downstream end of the movable member to the annular curved portion of the fixed member, the control area being substantially perpendicular to the surface of the annular curved portion, wherein the size of the control area decreases at a decreasing rate in response to movement of the movable member toward the downstream end at a constant rate so that the pressure drop of fluid flowing through the passage increases substantially linearly in direct proportion to the displacement of the movable member from the upstream position.

5. The limiter of claim 4 wherein the biasing member is a spring preloaded so that the movable member is constrained in the upstream position until the flow rate of fluid across the movable member exceeds a threshold flow rate and causes the spring to deflect and the movable member to be displaced downstream.

6. A flow control limiter for limiting the volumetric flow rate of a fluid flowing through a flow line, the flow line defining an upstream end and a downstream end, the limiter comprising:

two mating fittings defining the flow line a fixed member disposed in the flow line, the fixed member having an annular curved portion which extends curvilinearly from a longitudinally oriented subportion toward a radially oriented subportion upstream of the longitudinally oriented subportion, the radially oriented subportion being sandwiched between the two mating fittings;

a movable member disposed in the flow line in the path of the fluid and defining with the annular curved portion of the fixed member, a flow passage therebetween;

means threadingly engaged with the fixed member and in contact with the movable member in the upstream position for constraining upstream movement of the movable member beyond the upstream position;

a biasing member acting on the movable member to bias the movable member towards the upstream position;

wherein the pressure of the fluid causes movement of the movable member relative to the fixed member towards a downstream position;

the members being configured so that the pressure drop of fluid flowing through the passage increases substantially linearly in direct proportion to the displacement of the movable member from the upstream position wherein;

a control area is defined in the flow passage and extends from the downstream end of the movable member to the curved portion of the fixed member, the control area being substantially perpendicular to the surface of the curved portion, wherein the size of the control area decreases at a decreasing rate in response to movement of the movable member toward the downstream end at a constant rate wherein the surface of the curved portion is configured so that the decreasing rate at which the size of the control area decreases is such that for a first incremental downstream displacement of the movable member the control area decreases by a first quantity, and for a second downstream incremental displacement of the movable member equal in magnitude to the first increment, the control area decreases by a second quantity, the first quantity being substantially the square of the second quantity.

7. The limiter of claim 6 wherein the biasing member is a spring preloaded to maintain the movable member in the first position when the net force imparted to the movable member from fluid flowing through the limiter is less than a threshold force.

8. The limiter of claim 6 wherein the neck portion includes a threaded hole extending longitudinally therethrough and the means is a bolt threadingly secured in the hole, the bolt including a head sized to limit upstream displacement of the movable member.

9. The limiter of claim 6 wherein the neck portion includes a hole extending longitudinally therethrough and the means is a rivet secured in the hole, the rivet having a head sized to limit upstream displacement of the movable member.

* * * * *

UNITED STATES PATENT AND TRADEMARK OFFICE
CERTIFICATE OF CORRECTION

PATENT NO. : 5,653,257
DATED : August 5, 1997
INVENTOR(S) : Mervyn Johnston

It is certified that error appears in the above-identified patent and that said Letters Patent is hereby corrected as shown below:

Column 3, lines 42 and 43, "portion 12b of the stator 12. The area $A_1$ and $A_2$ are configured to be as large as possible" should be deleted.

Column 3, lines 44 and 45, "shown in Fig. 3A" should be deleted.

Column 6, line 17, "fiat" should be --flat--.

Signed and Sealed this

Seventh Day of April, 1998

Attest:

BRUCE LEHMAN

*Attesting Officer*      *Commissioner of Patents and Trademarks*